United States Patent
Darr

(10) Patent No.: US 6,929,139 B2
(45) Date of Patent: Aug. 16, 2005

(54) PLASTIC CONTAINER WITH SIDEWALL CONSTRUCTION

(75) Inventor: Richard C. Darr, Medina, OH (US)

(73) Assignee: Plastipak Packaging, Inc., Plymouth, MI (US)

(*) Notice: Subject to any disclaimer, the term of this patent is extended or adjusted under 35 U.S.C. 154(b) by 26 days.

(21) Appl. No.: 10/746,706

(22) Filed: Dec. 23, 2003

(65) Prior Publication Data

US 2005/0139571 A1  Jun. 30, 2005

Related U.S. Application Data

(63) Continuation-in-part of application No. 10/734,350, filed on Dec. 12, 2003.

(51) Int. Cl.[7] .............................. B65D 1/02; B65D 1/42
(52) U.S. Cl. ..................... 215/382; 215/375; 220/672; 220/675
(58) Field of Search ........................ 215/42, 43, 45, 215/373, 375, 382, 383; 220/606, 669, 672, 220/675

(56) References Cited

U.S. PATENT DOCUMENTS

| | | | | |
|---|---|---|---|---|
| 3,225,950 A | * | 12/1965 | Josephsen et al. | 215/384 |
| 3,309,836 A | * | 3/1967 | Hallowell, Jr. | 53/478 |
| 3,403,804 A | * | 10/1968 | Colombo | 215/45 |
| 4,497,855 A | | 2/1985 | Agrawal et al. | |
| 4,591,060 A | * | 5/1986 | Tsukada et al. | 215/42 |
| 5,067,622 A | * | 11/1991 | Garver et al. | 215/381 |
| 5,224,616 A | * | 7/1993 | Crisci | 215/256 |
| 5,529,196 A | * | 6/1996 | Lane | 215/375 |
| 5,732,838 A | * | 3/1998 | Young | 215/384 |
| 5,988,417 A | * | 11/1999 | Cheng et al. | 215/383 |
| 6,065,624 A | * | 5/2000 | Steinke | 215/383 |
| 6,296,131 B2 | * | 10/2001 | Rashid | 215/383 |
| 6,496,131 B2 | * | 12/2002 | Yoshinaga | 341/150 |
| 6,569,376 B2 | | 5/2003 | Wurster et al. | |
| 6,612,451 B2 | | 9/2003 | Tobias et al. | |
| 6,662,960 B2 | | 12/2003 | Hong et al. | |

* cited by examiner

*Primary Examiner*—Sue A. Weaver
(74) *Attorney, Agent, or Firm*—Robert H. Bachman

(57) ABSTRACT

A blow molded plastic container having a circular base, a cylindrical sidewall extending upwardly from the base and a neck finish projecting upwardly from the sidewall. The sidewall includes a plurality of spaced apart, continuous, circumferential grooves extending around the sidewall. The grooves are separated by raised areas.

20 Claims, 9 Drawing Sheets

PLASTIC CONTAINER WITH SIDEWALL CONSTRUCTION

CROSS REFERENCE TO RELATED APPLICATIONS

This application is a continuation-in-part of copending U.S. patent application Ser. No. 10/734,350 for PLASTIC CONTAINER AND PREFORM, filed Dec. 12, 2003 pending.

BACKGROUND OF THE INVENTION

It is highly desirable to provide a lightweight plastic container having a substantially rigid sidewall suitable for holding a variety of products.

A substantially rigid, lightweight plastic container should desirably have resistance to deformation and improve the aesthetic display of a label. Conventionally, plastic containers sidewall configurations that serve to improve resistance to deformation include features such as strengthening ribs or flex panels.

However, there are problems that sometimes occur with flex panels and strengthening ribs, for example, with respect to labeling. Indentations, voids or spaces can sometimes be intentionally or unintentionally formed at or about the label mounting portion of the container. Such structural features can cause the label to wrinkle, tear, or otherwise distort and, among other things, can inhibit or prevent the prominent display of an aesthetically pleasing label. Moreover, some consumers desire a container that is filled with product wherein a label is wrapped tightly around the container and is adhered to what feels like a solid and more rigid container sidewall.

The problem is exacerbated when one attempts to provide a lightweight plastic container, which is highly desirable. A lightweight plastic structure will distort more readily, and yet a lightweight plastic container represents a highly desirable commercial structure for a variety of products.

It is also desirable to provide an improved base structure in combination with an improved sidewall structure.

It is, therefore, an object of the present invention to provide an improved plastic container with a strengthened body or sidewall structure.

It is a further object of the present invention to provide an improved container as aforesaid which is lightweight and which has a combination of strengthened sidewall, aesthetically pleasing and reliable label application area, and improved base structure.

Further objects and advantages of the present invention will appear hereinbelow.

SUMMARY OF THE PRESENT INVENTION

In accordance with the present invention the foregoing objects and advantages are obtained.

The improved container of the present invention comprises: a blow molded plastic container having a circular base, a cylindrical sidewall projecting upwardly from said base, a neck finish projecting upwardly from said sidewall and having an opening to the inside of the container; wherein the sidewall includes a substantially flat upper label panel and a substantially flat lower label panel spaced from the upper label panel, a plurality of spaced apart, continuous, uninterrupted, circumferential grooves each extending completely around the sidewall, said grooves being separated by raised areas, and said raised areas including a substantially flat area having a length in the direction of the central axis of the container of from 0.200 inch to 0.120 inch.

The aforesaid grooves are located between the upper and lower label panels, and at least three and preferably at least five of these grooves are provided.

Desirably, at least one additional continuous groove is located in at least one of (1) above the upper label panel, and (2) below the lower label panel. At least two of the additional, continuous grooves are desirably provided. The additional continuous grooves are separated by raised areas, with the raised areas separating the additional grooves including a substantially flat portion having a length in the direction of the axis of the container of from 0.080 inch to 0.090 inch.

The grooves run generally perpendicular to the central axis of the container.

The base preferably includes a plurality of outwardly extending struts and a central recessed area.

Further features of the present invention will appear hereinbelow.

BRIEF DESCRIPTION OF THE DRAWINGS

The present invention will be more readily understandable from a consideration of the following, illustrative drawings, wherein.

DETAILED DESCRIPTION OF PREFERRED EMBODIMENTS

Figure 1:
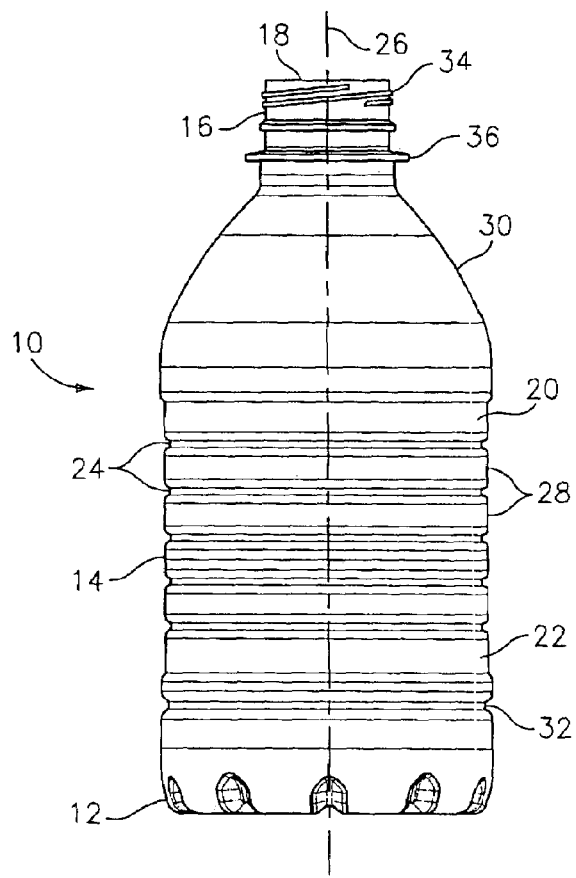
FIG. 1 is a side view of one embodiment of the container of the present invention.
Figure 2:
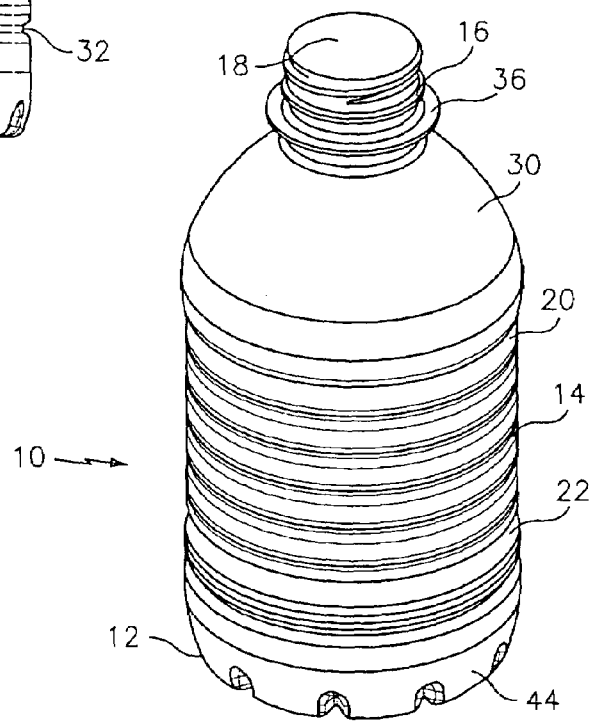
FIG. 2 is a perspective view of the container of FIG. 1.

Referring to the drawings, FIGS. 1 and 2 show one embodiment of the container of the present invention, a 12 ounce juice container, which is a blow molded container 10 having a circular base 12, a cylindrical sidewall 14 projecting upwardly from the circular base 12, a neck finish 16 projecting upwardly from the sidewall 14 and having an opening 18 to the inside of the container.

The sidewall 14 includes a substantially flat upper label panel 20 and a substantially flat lower label panel 22 for attachment of a label (not shown) thereto. The label panels each preferably have a length in the direction of the central axis 26 of container 10 from 0.150 inch to 0.200 inch. The sidewall 14 also includes a plurality of spaced apart, continuous, circumferential grooves 24 each extending completely around the sidewall 14 in a direction generally perpendicular to the central axis 26 of container 10. The grooves 24 are separated by raised areas 28. Grooves 24 are located between upper label panel 20 and lower label panel 22. In the embodiment of FIGS. 1 and 2 five grooves 24 are located between the upper and lower label panels, with the said five grooves 24 separated by four raised areas 28.

Continuous, gradually inclined shoulder area 30 is provided at the upper end of the sidewall 14 and above the upper label panel 20, between the upper label panel and the neck finish.

At least one additional continuous groove 32 is located below lower label panel 22 and between base 12 and the lower label panel. The neck finish 16 in FIGS. 1 and 2 is a threaded neck finish having threads 34 to accommodate a threaded closure, with an outwardly extending flange 36 beneath the threads.

Figure 3:
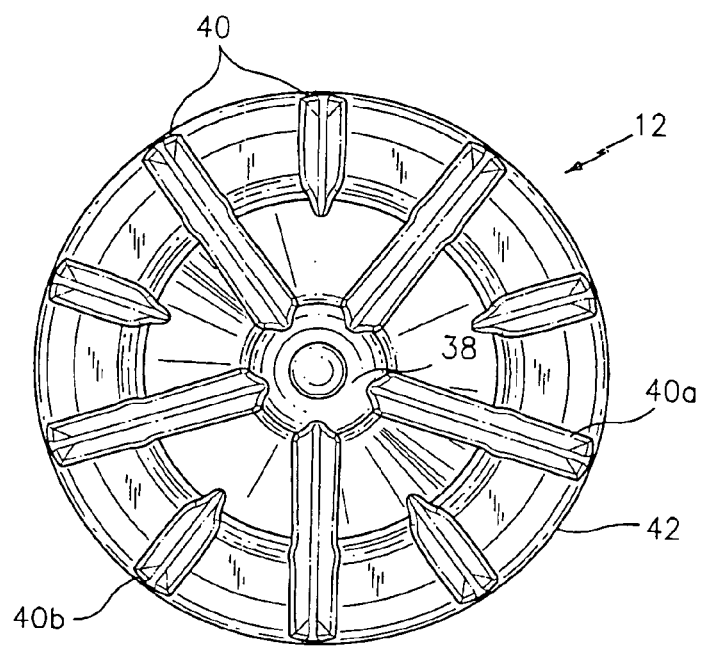
FIG. 3 is a bottom view of the base of the container of FIG. 1.

Base 12, shown in more detail in FIG. 3, desirably includes a central recessed area 38 and a plurality of outwardly extending struts 40 having a curved cross-section. In the embodiment shown in FIG. 3, five struts 40a extend from the edge 42 of base 12 to the central recessed area 38, and five shorter struts 40b extend from edge 42 of the base 12 partway to recessed area 38. Also, in the embodiment of FIG. 3 the disposition of the struts is that the shorter struts 40b alternate with the longer struts 40a. The struts form stable feet 44 as can be clearly seen in FIG. 2, and provide stability to the base.

Figure 4:
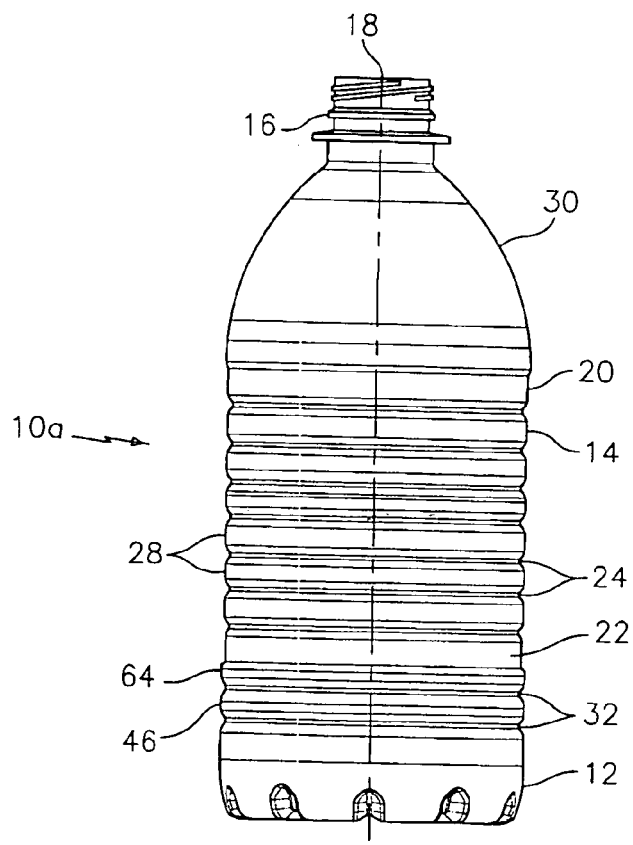
FIG. 4 is a side view of an alternate embodiment of the container of the present invention.
Figure 5:
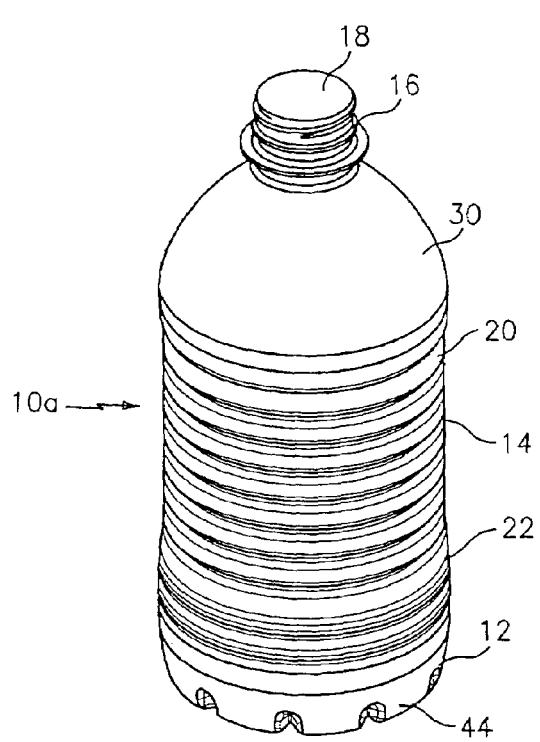
FIG. 5 is a perspective view of the container of FIG. 4.

FIGS. 4–5 show an alternate embodiment of the container of the present invention showing a 20 ounce container 10a having a circular base 12, sidewall 14 and neck finish 16 with uppermost opening 18, as in FIGS. 1 and 2. However, container 10a includes seven continuous circumferential grooves 24, each extending completely around the sidewall, between upper label panel 20 and lower label panel 22, and six raised areas 28 between grooves 24. Also, container 10a includes two additional continuous, circumferential grooves 32 each extending completely around the sidewall 14 beneath lower label panel 22, with an additional raised area 46 between the additional grooves 32. An additional raised area 64 is provided above the uppermost additional groove 32. The base and neck finish of container 10a is essentially the same as the base and neck finish of container 10. Also, container 10a includes a continuous, gradually inclined shoulder area 30 as in container 10.

Figure 11:
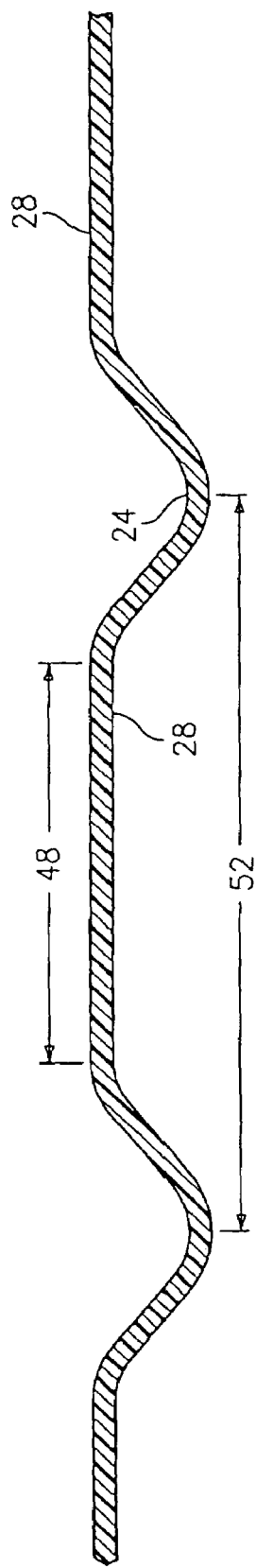
FIG. 11 is an enlarged detail view of the grooves and raised areas between the label panels.

FIG. 11 is an enlarged, detail view of the circumferential grooves 24 and raised areas 28 between the upper label panel 20 and lower label panel 22. As can be clearly seen in FIG. 11, the raised areas 28 include a substantially flat portion 48 having a length in the direction of central axis 26 of from 0.200 inch to 0.120 inch. In the embodiment of FIG. 11 the length of flat portion 48 is 0.170 inch.

Figure 12:
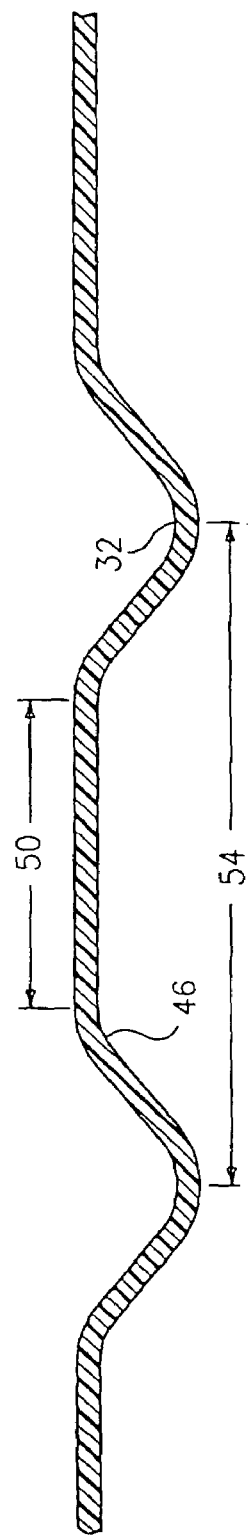
FIG. 12 is an enlarged detail view of the grooves and raised areas beneath the lower label panel.

FIG. 12 is an enlarged, detail view of the additional grooves 32 beneath lower label panel 22. As can be seen on FIG. 6, to be discussed below, six additional grooves 32 are separated by five additional raised areas 46, including an additional, substantially flat portion 50. However, the additional substantially flat portion 50 between additional grooves 32 is shorter than substantially flat portion 48 between grooves 24. The length of the additional substantially flat portion or portions 50 in the direction of axis 26 will vary between 0.080 inch and 0.090 inch. In the embodiment of FIG. 12 the length of the additional flat portion 50 is 0.085 inch.

In addition, the distance 52 between the center of a circumferential groove 24 and the center of a neighboring circumferential groove will vary between 0.340 inch and 0.400 inch; whereas, the additional circumferential grooves 32 are closer together, with the distance 54 between the center of an additional circumferential groove 32 and the center of a neighboring additional circumferential groove varying between 0.300 inch and 0.330 inch.

Flat portion 48 between grooves 24 supports the label so that the label does not have an adverse wrinkling. In addition, the raised area or ribs 28 makes the container desirably rigid for convenient handling. The length of flat portion 48 in the direction of axis 26 between 0.120 inch and 0.200 inch has been found to be particularly advantageous. If the length gets too short with a dimension less than 0.120 inch, label wrinkling tends to occur. On the other hand, if the length of the flat portion 48 is too long, with a dimension over 0.200 inch, a lightweight container tends not to be sufficiently strong to enable one to grip the container sidewall without the sidewall buckling.

However, the additional raised area or areas 46 beneath the lower label panel 22 serve a different purpose than raised areas 28. Since wrinkling of a label is not a problem for the additional raised area or areas 46, one may shorten the additional flat portion or portions 50 of additional raised areas 46 and place the additional grooves 32 closer together to obtain improved or optimum sidewall rigidity in order to insure that the containers are not damaged under normal handling through the filling and distribution system.

Figure 13:
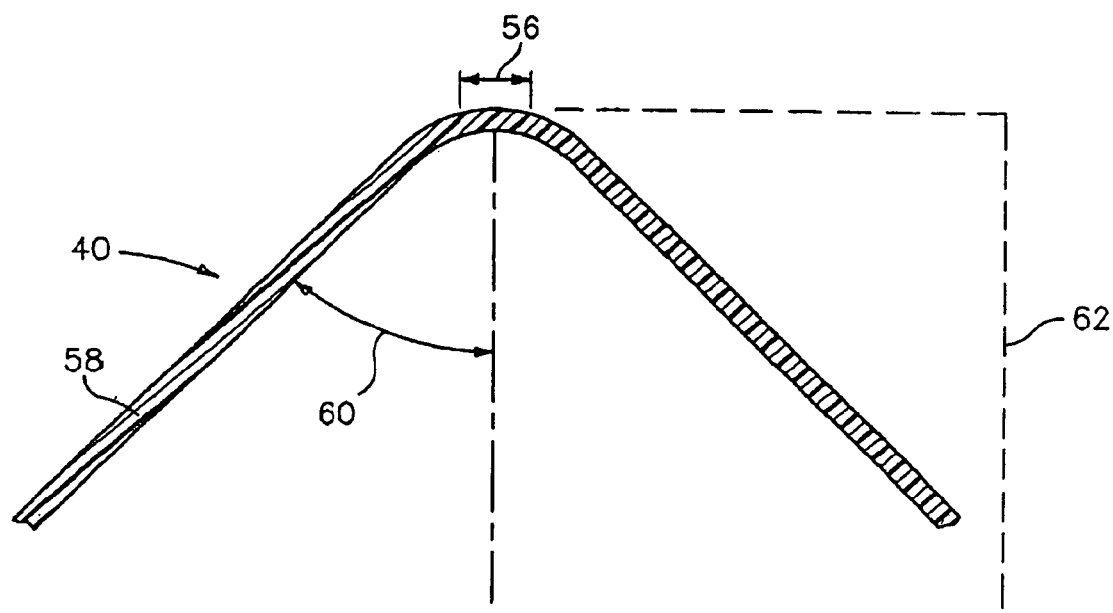
FIG. 13 is an enlarged detail view of a strut on the base.

FIG. 13 is an enlarged, detail view of a strut 40 on base 12. The upper portion or peak of strut 40 has a substantially flat portion 56 having a length of from 0.010 inch to 0.040 inch, to aid in providing stability to the container. Downwardly extending arms 58 define an angle 60 of from 35 degrees to 45 degrees, preferably 40 degrees, and the depth 62 of the strut will vary from 0.090 inch to 0.120 inch, preferably about 0.100 inch.

Figure 6:
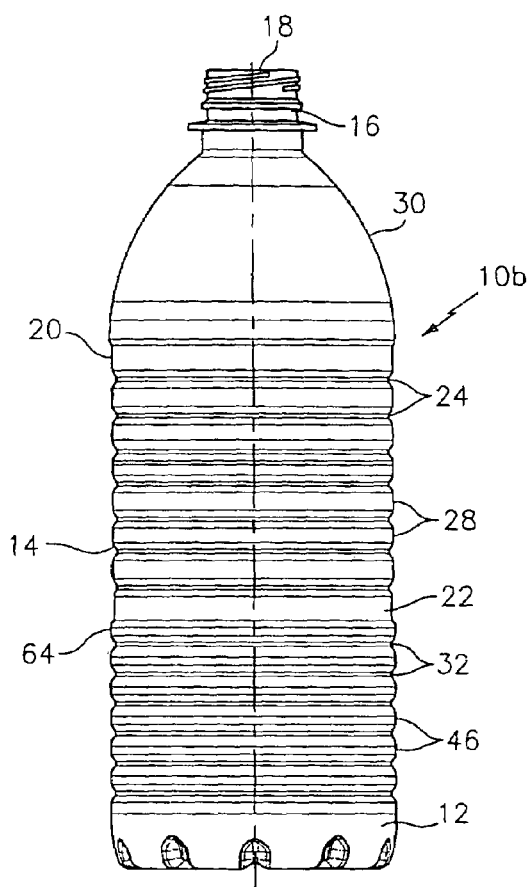
FIGS. 6–10, inclusive.

FIG. 6 is a still further embodiment of the container of the present invention showing a 24 ounce container 10b having a circular base 12, sidewall 14 and neck finish 16 with uppermost opening 18, as in FIGS. 1–2. Container 10b includes seven of said circumferential grooves 24 between upper label panel 20 and lower label panel 22 and six of said raised areas 28 between grooves 24 as in FIGS. 4–5. However, container 10b includes six of said additional continuous, circumferential grooves 32 beneath lower label panel 22, with five additional raised areas 46 between the additional grooves 32, and one further additional raised area 64 above the uppermost additional groove 32. The base 12, neck finish 16 and shoulder 30 are essentially the same as in the previous embodiments.

Figure 7:
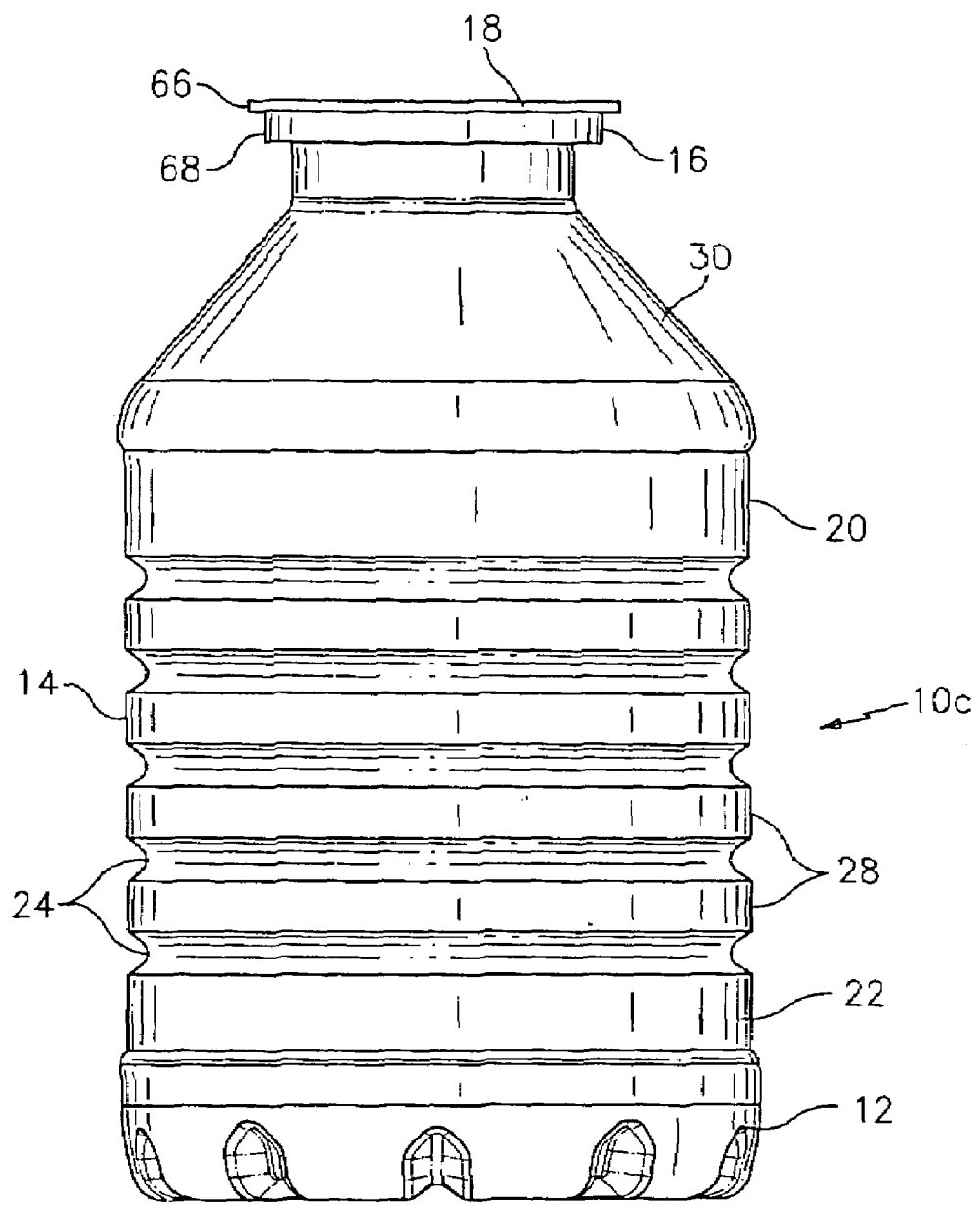

FIG. 7 is a still further embodiment of the container of the present invention showing a 200 ml container 10c having a circular base 12, sidewall 14 and neck finish 16 with uppermost opening 18. Sidewall 14 of container 10c includes five of said circumferential grooves 24 between upper label panel 20 and lower label panel 22 and four of said raised areas 28 between grooves 24. No additional grooves are provided beneath the lower label panel. Shoulder 30 is provided between the upper label panel 20 and neck finish 16. However, the neck finish in the previous embodiments showed a threaded finish with a lower outwardly extending flange, whereas neck finish 16 in container 10c has a stepped finish with an uppermost, outwardly extending flange 66 and a lower flange 68, beneath flange 66 which extends outwardly less than flange 66. The neck finish 16 on container 10c can accommodate a foil closure and/or a snap-on closure, and the threaded neck finishes of the previous embodiments accommodate a screw-on closure.

Figure 8:
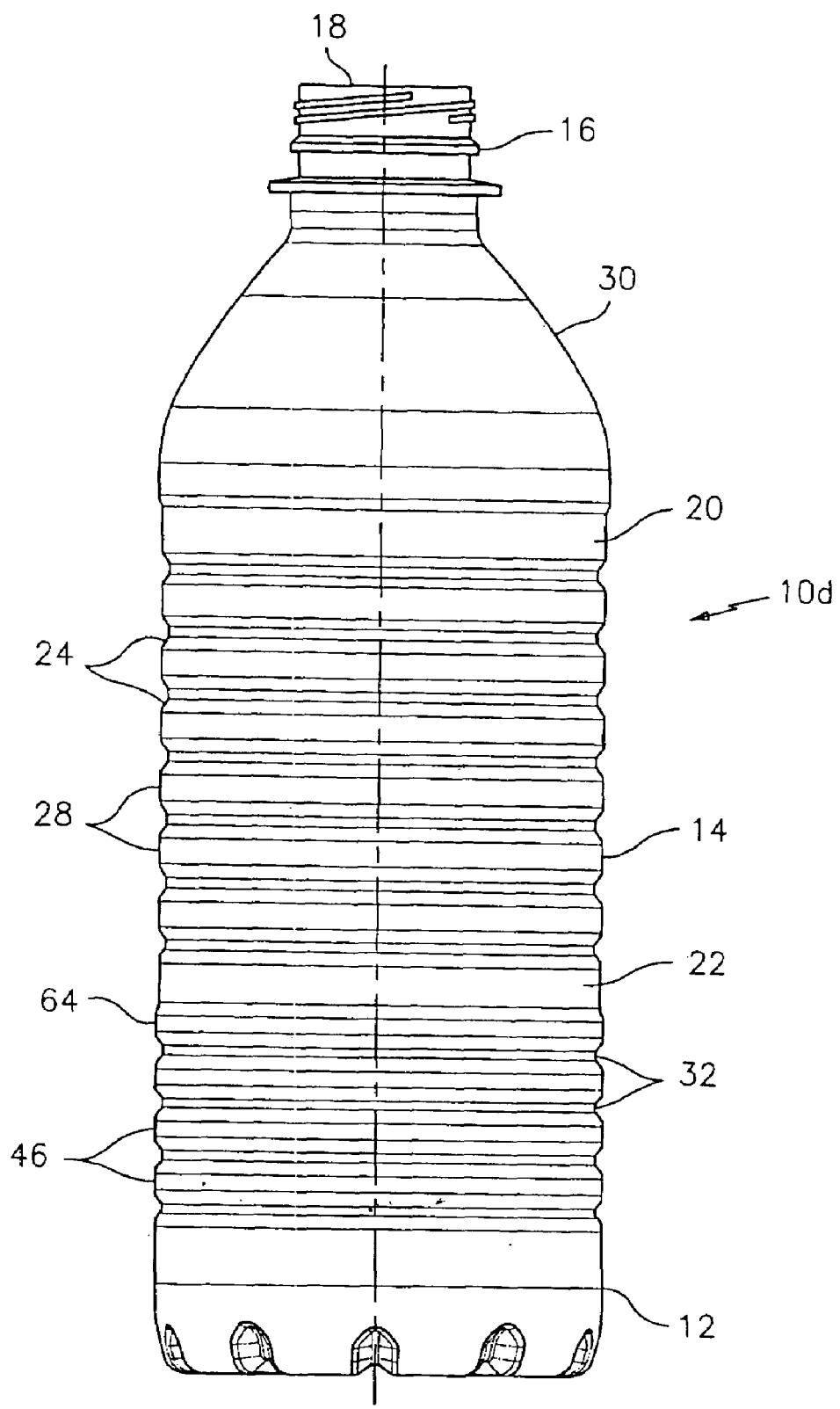

FIG. 8 is a still further embodiment of the container of the present invention showing a 500 ml container 10d having a circular base 12, sidewall 14 and neck finish 16 with uppermost opening 18 as in FIGS. 1–2. Container 10d includes seven of said circumferential grooves 24 between upper label panel 20 and lower label panel 22 and six of said raised areas 28 between grooves 24 as in FIGS. 4–5. However, container 10d includes four of said additional grooves 32 beneath lower label panel 22 with three additional raised areas 46 between the additional grooves 32, and one further additional raised area 64 above the uppermost additional groove 32. The base 12, neck finish 16 and shoulder 30 are essentially the same as in FIGS. 1–2.

Figure 9:
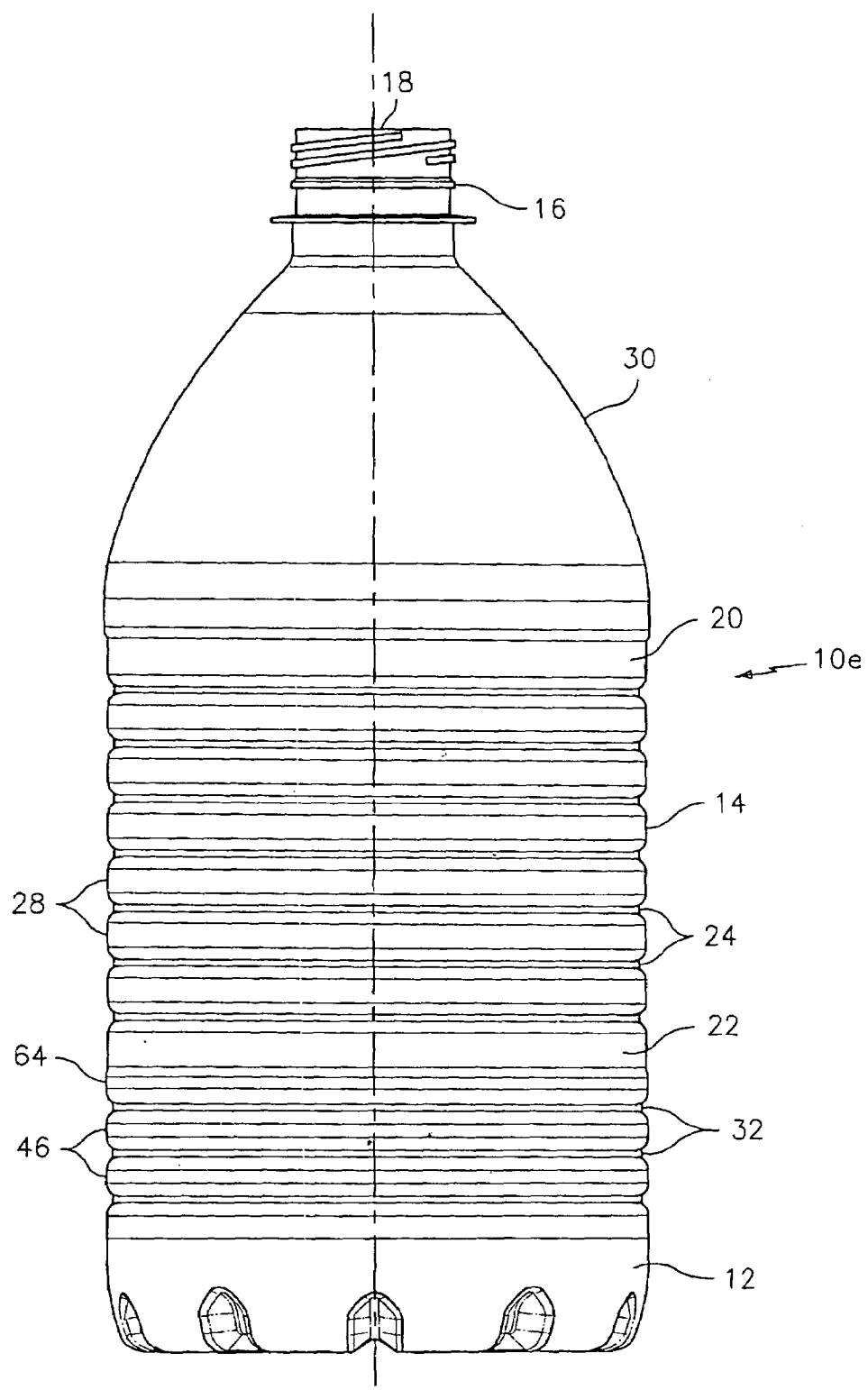

FIG. 9 is an additional embodiment of the container of the present invention showing a one liter container 10e having a circular base 12, sidewall 14 and neck finish 16 with uppermost opening 18 as in FIGS. 1–2. Container 10e includes seven of said circumferential grooves 24 between upper label panel 20 and lower label panel 22, and six of said raised areas 28 between grooves 24 as in FIGS. 4–5. However, container 10e includes three of said additional grooves 32 beneath lower label panel 22 with two additional raised areas 46 between the additional grooves 32 and one further additional raised area 64 above the uppermost additional groove 32. The base 12, neck finish 16 and shoulder 30 are essentially the same as in FIGS. 1–2.

Figure 10:
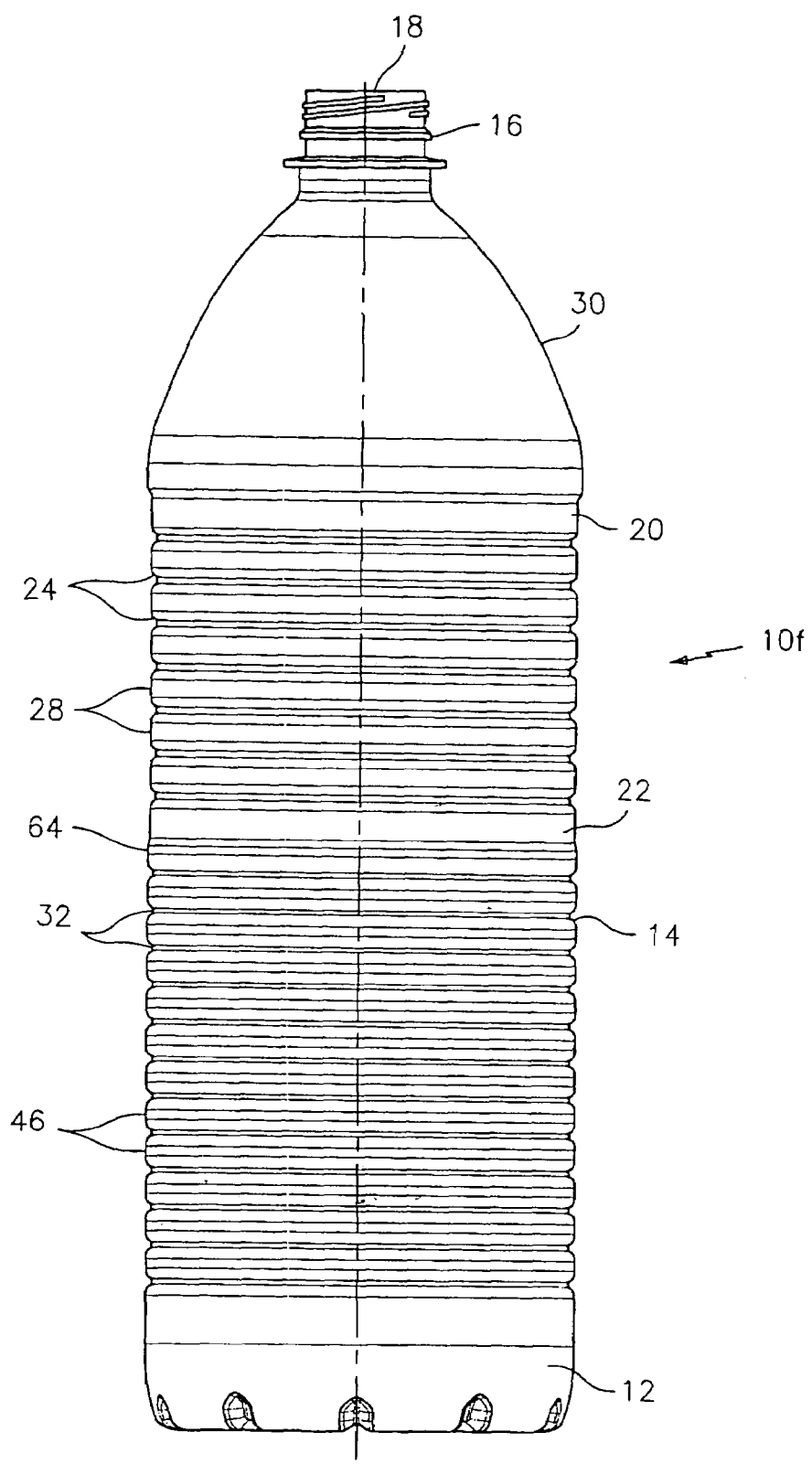

FIG. 10 is an additional embodiment of the container of the present invention showing a 1.5 liter container 10f having a circular base 12, sidewall 14 and neck finish 16 with uppermost opening 18 as in FIGS. 1–2. Container 10f includes seven of said circumferential grooves 24 between upper label panel 20 and lower label panel 22, and six of said raised areas 28 between grooves 24 as in FIGS. 4–5. However, container 10f includes twelve said additional grooves 32 beneath lower label panel 22 with eleven additional raised areas 46 between the additional grooves 32, and one further additional raised area 64 above the uppermost additional groove 32. The base 12, neck finish 16 and shoulder 30 are essentially the same as in FIGS. 1–2.

Figure 14:
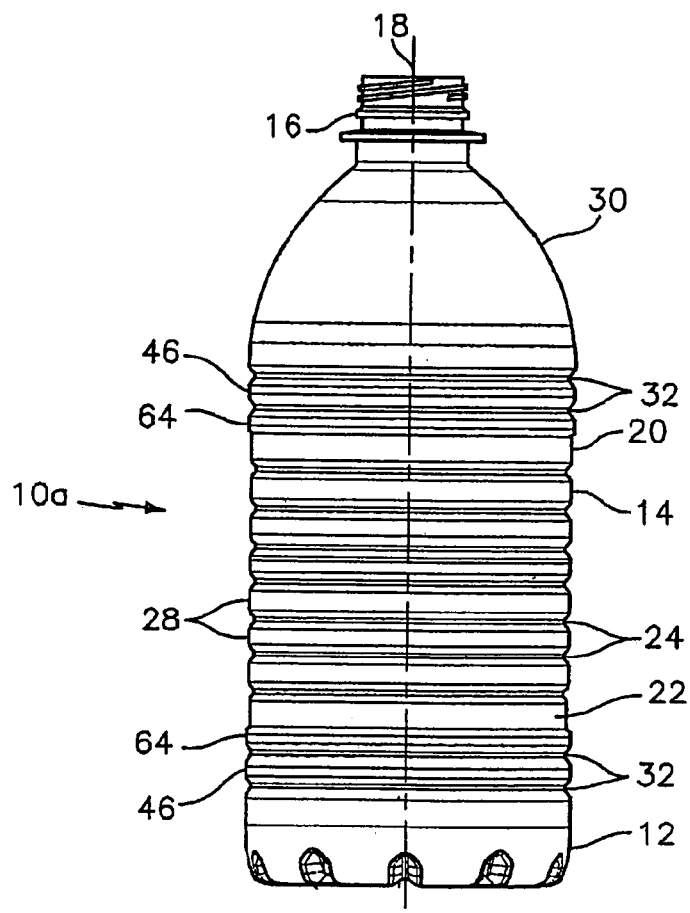
FIG. 14, are side views of further embodiments of the container of the present invention.

FIG. 14 is an additional embodiment of the container of the present invention showing additional grooves 32 and additional raised area 46 above and below the label panels.

The container of the present invention offers considerable advantages.

The present invention provides an advantageous, lightweight container particularly suitable for a wide variety of beverages. The container is quite versatile and can be provided in a wide variety of sizes and with a threaded neck finish or with a snap-on neck finish, or with a simple foil closure:

Moreover, the sidewall construction provides desirable rigidity while at the same time enabling label application without label wrinkling, tearing or distortion. In addition, the combination of sidewall construction and base construction provides a firm, stable container with aesthetically pleasing features.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A container which comprises:
   a blow molded plastic container having a circular base, a cylindrical sidewall projecting upwardly from said base, a neck finish projecting upwardly from said sidewall and having an opening to the inside of the container;
   wherein the sidewall includes a substantially flat upper label panel and a substantially flat lower label panel spaced from the upper label panel, a plurality of spaced apart, continuous, circumferential grooves located between the upper and lower label panels, each extending completely around the sidewall and running generally perpendicular to the central axis of the container, said grooves being separated by raised areas, and said raised areas including a substantially flat portion having a length in the direction of the central axis of the container of from 0.200 inch to 0.120 inch, and including at least one additional continuous groove and at least one additional raised area extending completely around the sidewall located in at least one of (1) above the upper label panel and (2) below the lower label panel, wherein said additional raised area includes a substantially flat portion having a length which is shorter than the length of the substantially flat portion on the raised areas between the circumferential grooves.

2. A container according to claim 1, including at least five of said continuous grooves.

3. A container according to claim 1, wherein said at least one additional groove is located below the lower label panel.

4. A container according to claim 3, including at least two of said additional grooves.

5. A container according to claim 1 wherein the substantially flat portion of said at least one additional raised area having a length in the direction of the central axis of the container of from 0.080 inch to 0.090 inch.

6. A container according to claim 5, wherein the distance between the center of an additional groove and a neighboring additional groove is from 0.300 inch to 0.330 inch.

7. A container according to claim 1, including a continuous, gradually inclined shoulder area extending between the upper label panel and the neck finish.

8. A container according to claim 1, wherein the base includes a plurality of outwardly extending struts and a central recessed area.

9. A container according to claim 1, wherein the distance between the center of a circumferential groove and a neighboring circumferential groove is from 0.340 inch to 0.400 inch.

10. A container according to claim 1, wherein the neck finish is a threaded neck finish.

11. A container according to claim 1, wherein the neck finish accommodates a foil closure.

12. A container according to claim 1, wherein the neck finish accommodates a snap-on closure.

13. A container according to claim 1, wherein the neck finish includes an inwardly oriented, stepped area adjacent said opening.

14. A container according to claim 1, wherein the said length of said flat portions between the circumferential grooves is about 0.170 inch.

15. A container according to claim 1, wherein said label panels each have a length in the direction of the central axis of the container of from 0.150 inch to 0.200 inch.

16. A container which comprises:
   a blow molded plastic container having a circular base, a cylindrical sidewall projecting upwardly from said base, a neck finish projecting upwardly from said sidewall and having an opening to the inside of the container;
   wherein the sidewall includes a substantially flat upper label panel and a substantially flat lower label panel spaced from the upper label panel, a plurality of spaced apart, continuous, circumferential grooves located between the upper and lower label panels, each extending completely around the sidewall and running generally perpendicular to the central axis of the container, said grooves being separated by raised areas, and said raised areas including a substantially flat portion having a length in the direction of the central axis of the container of from 0.200 inch to 0.120 inch and wherein the base includes a plurality of outwardly extending struts and a central recessed area, with said struts having a curved cross-section, with a substantially flat upper portion, wherein the substantially flat upper portion of the struts having a length of from 0.010 inch to 0.040 inch.

17. A container according to claim 16, wherein said struts extend from the edge of the base to the central recessed area.

18. A container according to claim 16, including additional struts between said struts which extend from the edge of the base partway to the central recessed area.

19. A container according to claim 16, including downwardly extending arms extending from the flat upper portion and defining an angle of from 35 to 45 degrees.

20. A container according to claim 16, wherein the depth of said struts will vary from 0.090 inch to 0.120 inch.

* * * * *